Aug. 31, 1965 W. HAUER ETAL 3,203,533
DISTRIBUTING SYSTEM FOR TRANSFER OF ARTICLES
Filed June 18, 1963 5 Sheets-Sheet 3

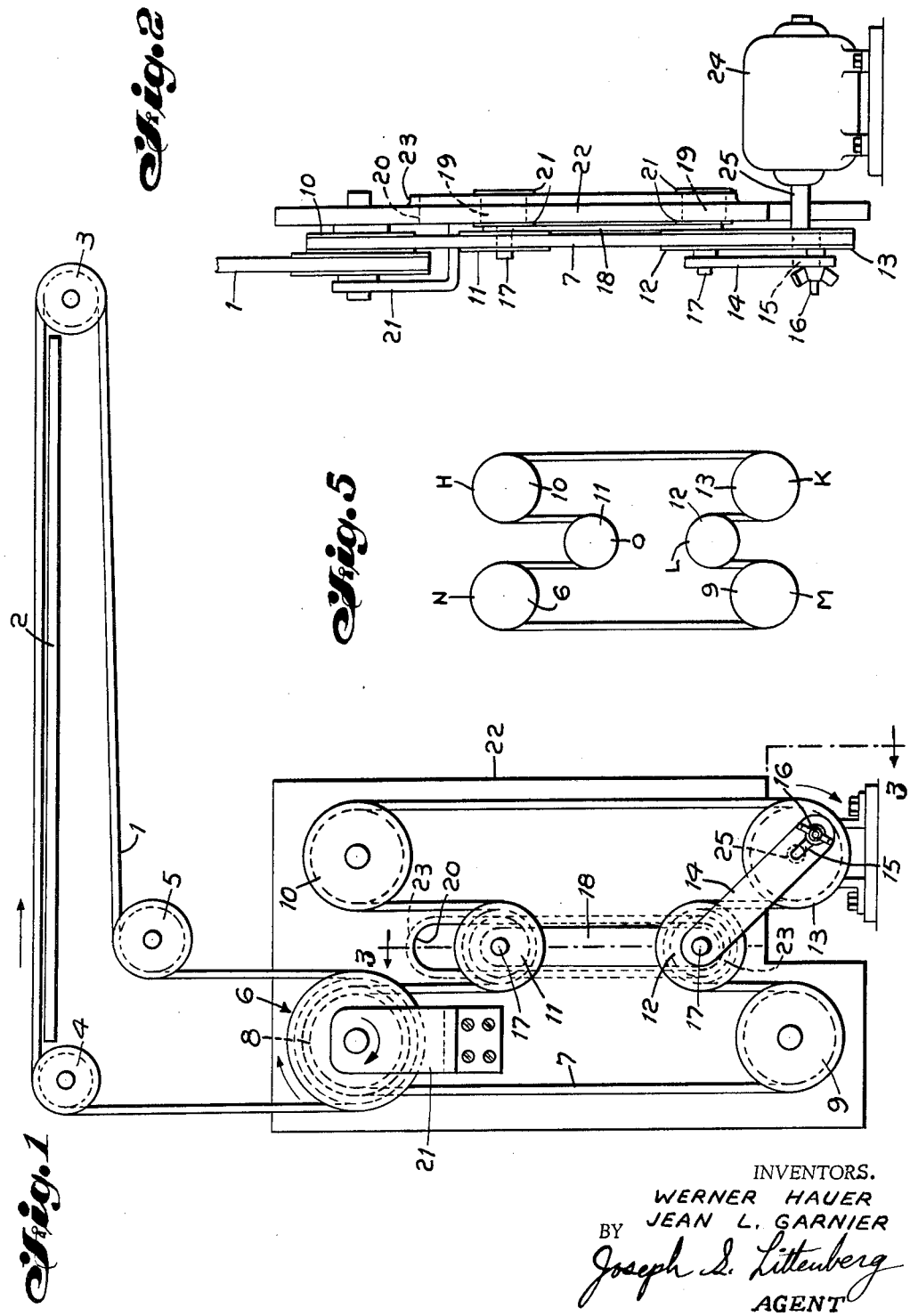

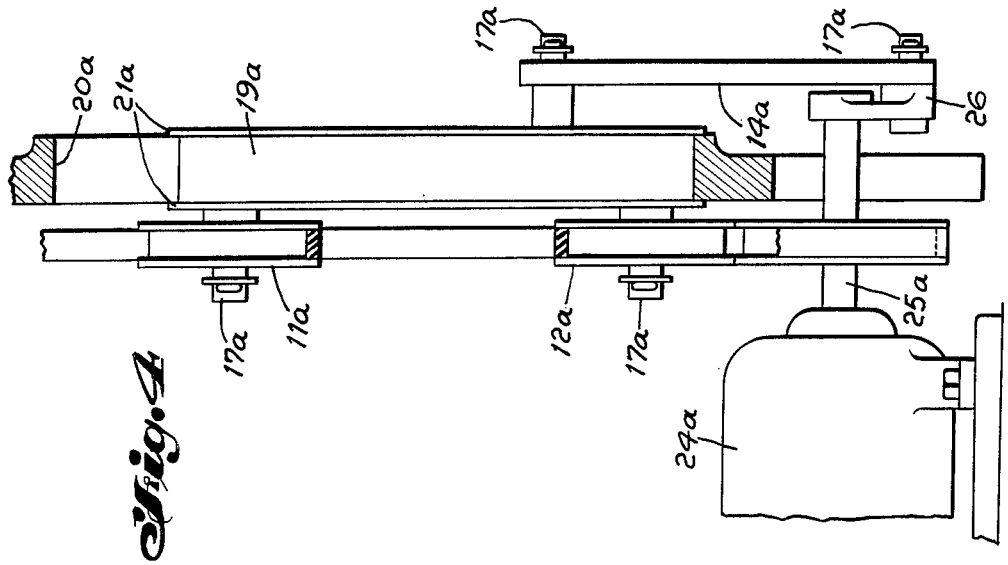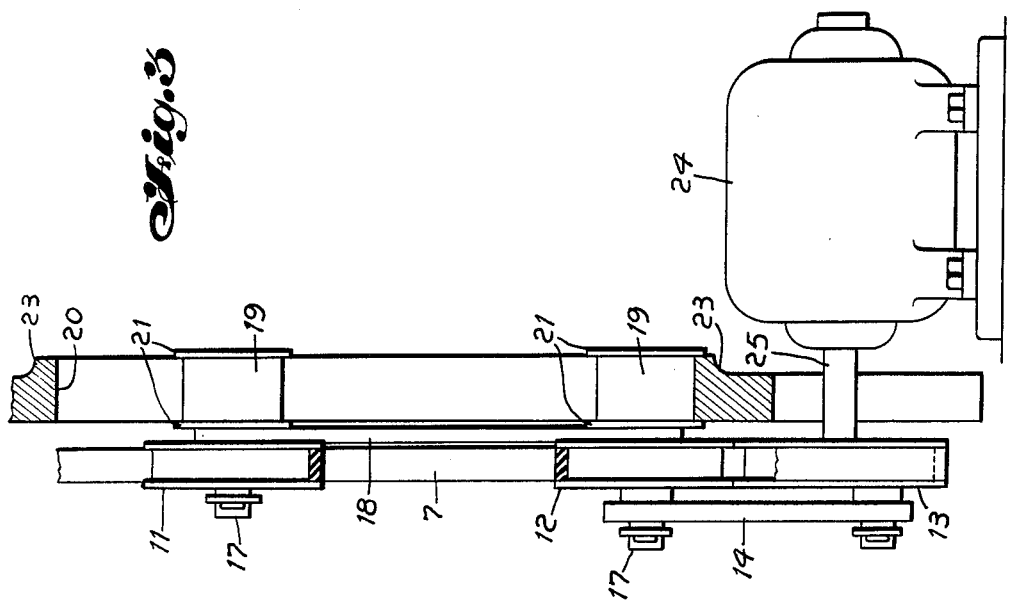

INVENTORS.
WERNER HAUER
BY JEAN L. GARNIER
Joseph S. Littenberg
AGENT

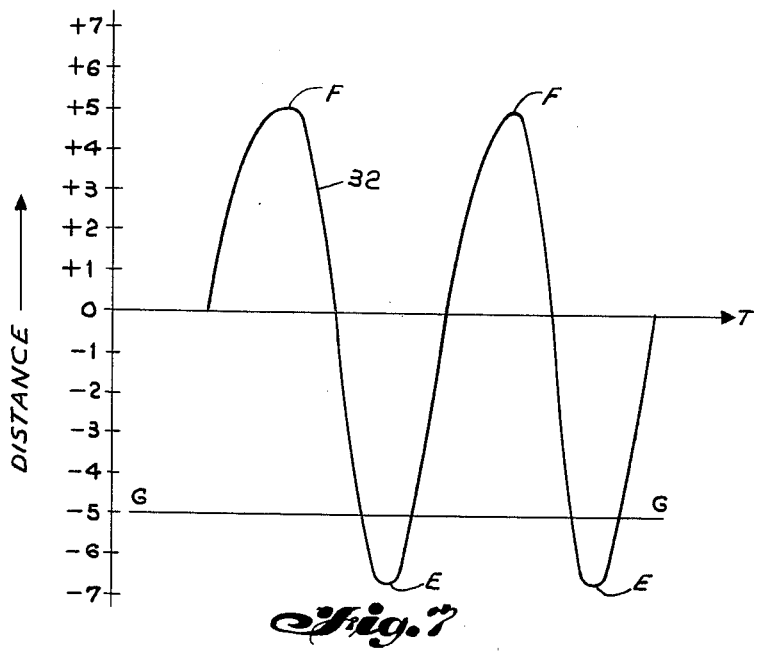
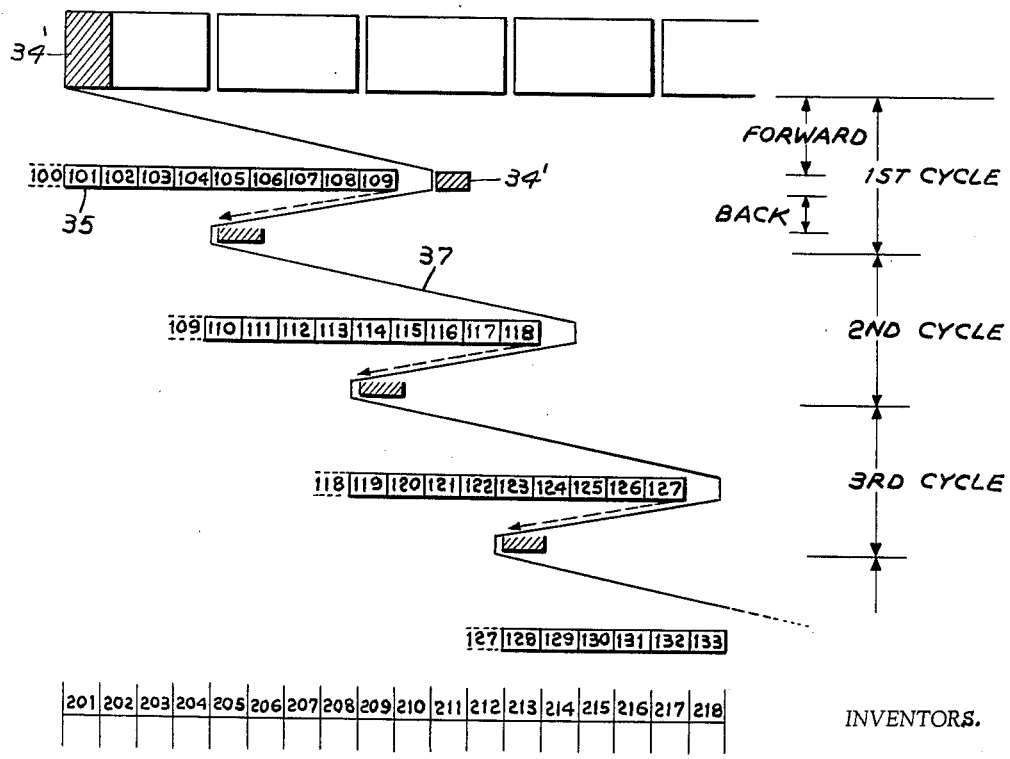

Aug. 31, 1965         W. HAUER ETAL         3,203,533
DISTRIBUTING SYSTEM FOR TRANSFER OF ARTICLES
Filed June 18, 1963                         5 Sheets-Sheet 5
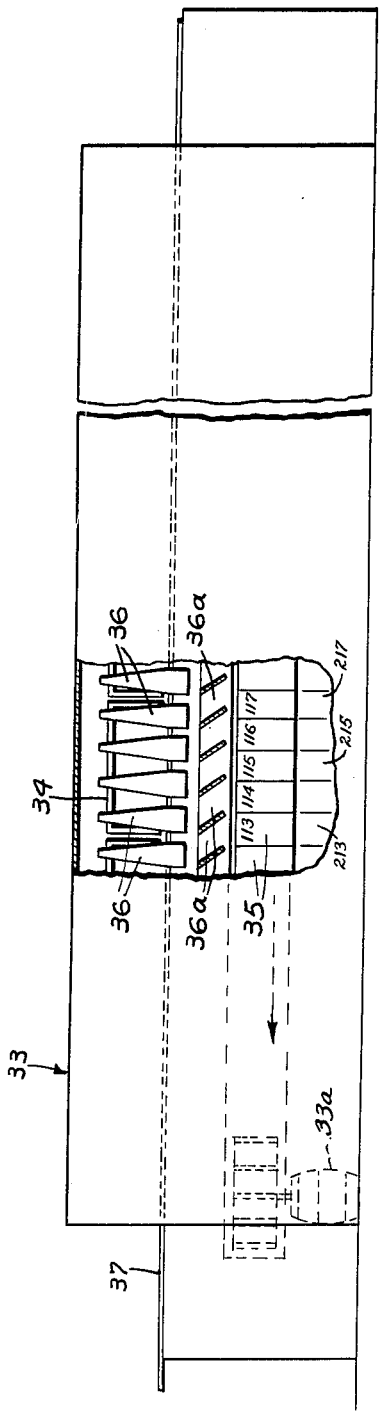
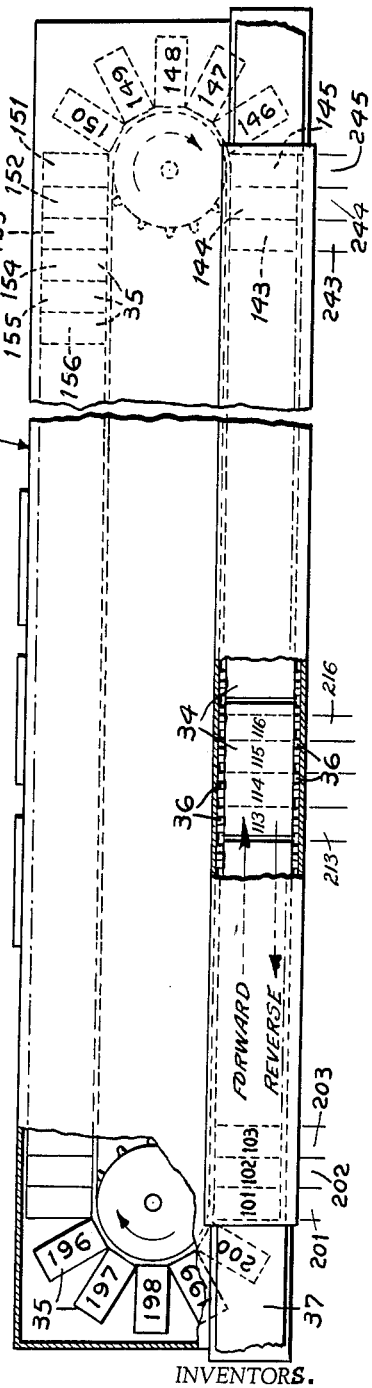
INVENTORS.
WERNER HAUER
BY  JEAN L. GARNIER
Joseph S. Littenberg
AGENT

United States Patent Office

3,203,533
Patented Aug. 31, 1965

1

3,203,533
DISTRIBUTING SYSTEM FOR TRANSFER
OF ARTICLES
Werner Hauer, Nutley, and Jean Leon Garnier, Wayne, N.J., assignors to International Telephone and Telegraph Corporation, Nutley, N.J., a corporation of Maryland
Filed June 18, 1963, Ser. No. 288,735
6 Claims. (Cl. 198—76)

This invention relates to apparatus for producing intermittent movement and more particularly to apparatus for driving belts so as to produce a continuously repeating and smoothly intermittent movement of the belts.

There are many known systems for producing intermittent movement, especially ones for use in feeding motion picture film. These systems use ratchet wheels, detent wheels, or pawl arrangements which produce a discontinuation or interruption of movement. Abrupt discontinuations are always undesirable and especially so when heavy equipment is to be driven.

It is therefore an object of our invention to provide apparatus for producing an intermittent and continuously repeating movement of a portion of a belt member by a continuous variation of the velocity of that portion of the belt.

Another object of our invention is the provision of means for conveying articles at varying speeds in a system so that the articles may move slowly through one portion of the system and rapidly through another.

Another object of our invention is the provision of a system for sorting articles which will utilize a minimum of space.

A feature of our invention is the provision of means for supporting a belt which can be moved while the belt is being driven so that a continuously repeating and smoothly intermittent movement of a portion of the belt is achieved while the rest of the belt moves at a constant velocity.

Another feature of our invention is the provision of means for supporting a belt, means including said support means for driving the belt, and means coupled to said driving means for moving said support means so that the total length of belt travel remains constant and a continuously repeating and smoothly intermittent movement of a portion of the belt is achieved.

A further feature of our invention is the provision of a system for sorting articles into a plurality of bins while the articles themselves travel a distance which is less than the total distance of the combined widths of all the bins served.

The above-mentioned and other features and objects of this invention will become more apparent by reference to the following description taken in conjunction with the accompanying drawings, in which:

FIGURE 1 is a side elevational view of apparatus in accordance with our invention;

FIGURE 2 is an end view of the apparatus of FIGURE 1;

FIGURE 3 is a cross-sectional view of the apparatus of FIGURE 1 taken along the lines 3—3.

FIGURE 4 is a cross-sectional view of another embodiment of apparatus in accordance with our invention;

FIGURE 5 is a schematic illustration of the arrangement of belt 7;

FIGURES 6 and 7 are graphical illustrations of the movement of our reciprocating pulleys;

FIGURES 8 and 9 are schematic representations of a machine utilizing apparatus in accordance with our invention; and FIGURE 10 is a schematic representation of the movement of trays and bins associated with the machine of FIGURES 8 and 9.

Figure 6:
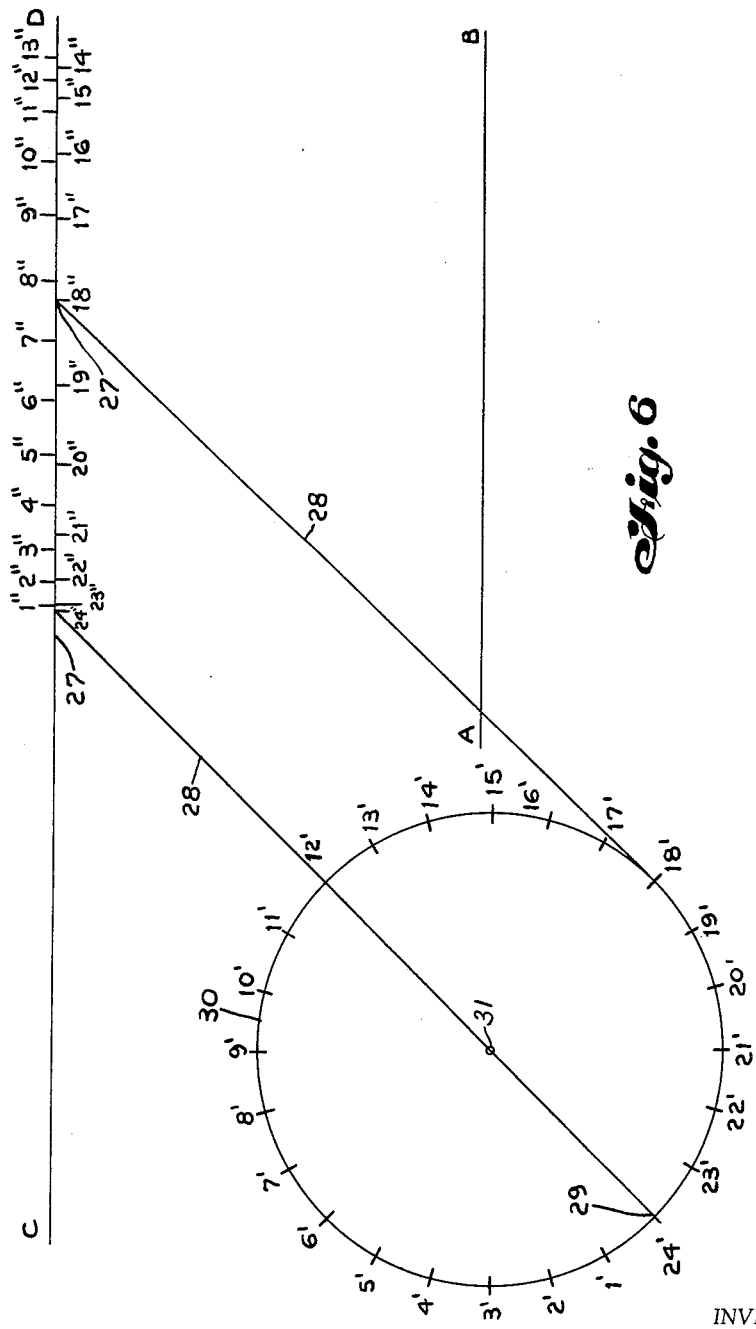

Referring now to FIGURES 1, 2, and 3 in which is shown apparatus for producing intermittent movement in accordance with our invention. An endless belt 1 for conveying articles along surface 2 is arranged over idler pulleys 3, 4, and 5. Pulley 6 is driven by endless belt 7 arranged adjacent its inner cylinder 8 and also adjacent idler pulleys 9, 10, 11, and 12, and driver pulley 13. Driver pulley 13 is connected to pulley 12 by rod 14 which is attached to driver pulley 13 in T slot 15 by means of a turned down socket head cap screw 16 and to pulley 12 by bolt 17. Pulleys 11 and 12 are rigidly connected to rod 18 by means of bolts 17. The idler pulleys 11 and 12 are rigidly attached by bolts 17 to bearings 19. Bearings 19 are slidably mounted in slot 20 of base plate 22 by means of flanges 21. Boss 23 reinforces base plate 22 adjacent the periphery of slot 20. Motor 24 drives pulley 13 via shaft 25 in a clockwise (FIGURE 1) direction which drives pulley 6 in a clockwise direction so that belt 1 is driven in the direction from pulley 4 to pulley 3 along surface 2.

Movement of pulleys 11 and 12 will not effect the length of travel of belt 7. When the pulleys 11 and 12 are moved upwards, the slack created by the movement of pulley 11 is taken up by pulley 12 as is hereinafter explained in detail with reference to FIGURE 5. When pulleys 11 and 12 are moved downward, the slack created by the movement of pulley 12 is taken up by pulley 11. The length of travel is a constant as the distance between pulley 11 and pulley 6 varies with the distance between pulley 12 and pulley 9 to always equal a constant. Also, if pulleys 6 and 9 or pulleys 10 and 13 were made movable and are moved together, the length of the path of belt 7 will not vary. Pulleys 11 and 12 may be farther apart than pulleys 6 and 9, and 10 and 13, respectively, in which case the belt 7 would be adjacent their outer surfaces. They could still be moved along a linear path and maintain the length of the path as long as neither of them moves within the pulleys 6, 9, 10, and 13 as the belt could not follow the moving pulleys inside the four fixed pulleys.

Movement of pulleys 11 and 12 in an upward direction will tend to move belt 7 in a counterclockwise direction over pulleys 6 and 9. The driver pulley 13 will tend to move pulley 6 in a clockwise direction over these pulleys. The reciprocating pulleys 11 and 12 impart a sinusoidal movement (as will be explained with reference to FIGURES 5 and 6) to the belt 7 which will either add to the movement of the driven belt (positive velocity) or detract (negative velocity) from it. By varying the position of rod 14 in slot 15 the amplitude of the sinusoidal movement of the pulleys 11 and 12 can be varied. Pulleys 11 and 12 move in a sinusoidal manner as they are driven by rotating pulley 6 while they are constrained to linear movement by slot 20. If the amplitude of the sine wave is adjusted so that at its maximum negative velocity it will be moving at the same rate of speed as the driver pulley 13, the belt 7 will be momentarily stopped. If the amplitude is larger, the negative velocity (counterclockwise) will exceed the clockwise velocity drive pulley 13 tends to impart to the belt 7 and cause the belt 1 to travel in the direction from guide pulley 3 to guide pulley 4.

For positive action, the pulleys 3, 4, 5, 6, 8, 9, 10, 11, 12, and 13 should be sprocketed and belts 1 and 7 provided with cooperating slots. The belt 1, pulleys 3, 4, and 5, and the outer pulley 6 can be eliminated as all that is needed to implement our invention is at least six curved surfaces, a belt arranged in the path formed by the curved surfaces, means for driving the belt, and means for causing two or more of the curved surfaces to move while the belt is being driven so that the length of the path is constant and a continuously repeating intermittent movement is imparted to the belt. The portion of the belt between pulleys 6 and 9 could then be used as a working conveyor. Pulleys 11 and 12 may be replaced by a rod shaped member provided with apertures for passing a belt through either of its two ends.

In FIGURE 4, an alternate method for imparting a reciprocating motion to a belt in accordance with our invention is shown. Pulleys 11a and 12a are rigidly attached to bearing 19a by means of bolts 17a. Bearing 19a is slidably mounted in slot 20a by means of flanges 21a. Motor 24a drives bearing 19a in a sinusoidal manner via shaft 25a, crank arm 26, and connecting rod 14a which is connected to bearing 19a and crank arm 26 by bolts 17a. Crank arm 26 may incorporate means for adjustably mounting rod 14a. A sinusoidal movement is once again achieved by constraining a circular or rotating drive to a linear path.

Referring now to FIGURE 5, the arrangement of belt 7 and pulleys 6, 9, 10, 11, 12, and 13 is schematically illustrated. If pulley 13 is the only driving force and it is driven at a constant rate every portion of belt 7 will move at a constant speed. Our invention allows one portion of the belt to move at a varying speed while another portion of the belt moves at a constant speed. The portion of the belt HK moves at the constant velocity imparted by driver pulley 13 while the portion of the belt LMNO moves at a velocity equivalent to the sum of the superimposed sinusoidal velocity and the constant velocity. This is accomplished by the use of "slack" in belt 7. The movement of this "slack" is controlled by pulleys 11 and 12. For instance, when pulley 12 moves away from pulley 13 at an instantaneous speed greater than the constant speed imparted by pulley 13, it will draw belt 7 with it at the difference velocity. In drawing belt 7 upwards it would appear that portion LK of the belt will draw on driver pulley 13. However, pulley 13 is caused to rotate at a constant speed by means well known to the art so that portion LM is taken from the slack created in portion NO. If pulleys 11 and 12 move at a rate which is slower than the constant rate, in a direction which will detract from the constant driving rate (but not stop it completely or reverse it) portion MN will move from M to N at the difference velocity. When the pulleys add to the constant velocity portion MN will move from M to N at a rate equal to the sum of the two velocities. By creating the slack loops NOH and KLM, portion LMNO can be driven at a different velocity than the rest of the belt. This is accomplished by adding to one slack loop exactly what is taken away from the other.

Thus by forcing a portion of the belt to move at a constant speed (pulley 13 always moves at a constant velocity) a varying speed can be accommodated by maneuvering slack loops NOH and KLM. A desired movement is then obtained along portion MN and this can be used as a conveyor section or the desired movement can be transmitted to a large conveyor via either pulley 6 or 9.

If pulley 12 is moving at 10 feet per second away from pulley 13 and the constant driving rate is 10 feet per second, there will be no relative movement between the portion KL and pulley 12. The pulley 12 will just take up the slack created at 10 feet per second by driver pulley 13 and draw on the slack created in loop NOH at the rate of 10 feet per second. Pulley 13 will draw portion OH at 10 feet per second. This, however, is drawn from slack loop NOH which is now reduced at 10 feet per second while slack loop KLM is created at the rate of 10 feet per second. When used as a timing belt, driver pulley 13 must be sprocketed. It is to be noted that in the example shown, if pulley 12 moves away from pulley 13 faster than 10 feet per second, belt 7 will move in reverse over pulley 12 at the difference velocity to add to portion LK the amount which is not added by pulley 13.

In order to encode an article of mail so that it can be processed in an automatic mail sorting system, it must be read by an operator who will identify it by causing a signal characteristic of its destination to be encoded on the article of mail or on an object associated with the article of mail. It is desirable to have letters move on an edgewise conveyor at a rapid speed to the operator's station and then slowly pass the station so that the address can be read and recorded in some manner by the operator. This is executed by our unique drive system as it takes a constant speed and breaks it up into a varying velocity so that the letter may be slowed down at a station for reading purposes and then moved rapidly away from the desk to its destination. When using our apparatus to drive an edgewise conveyor system carrying articles of mail, the mail can be instantaneously stopped or moved slowly in reverse in front of the operator's station. Usually the reciprocating motion imparted need not be enough to cause the conveyor to move in reverse or to stop as the operator can follow the letter with her eyes when it slows down and then slowly starts to pick up speed. As can be seen in FIGURES 6 and 7, the velocity of the reciprocating movement is at a minimum when it changes direction. Naturally it is zero at the exact moment of change in direction.

Referring now to FIGURES 6 and 7, the translation of circular drive into linear movement of connecting rod 14 is seen. Connecting rod 14 is represented as line 28. The end of connecting rod 14 which is joined to driver pulley 13 is represented as end 29. End 29 moves at a constant velocity along circular path 30 while end 27 traverses straight path CD. If end 27 is forced to move along a straight path perpendicular to the center 31 of circular path 30, for instance straight path AB, a representation of its movement will follow the pattern of a perfect sine wave. By off-setting straight path CD an approximate sine wave 32 is produced. The single prime numerals 1'–24' indicate various positions of end 29 of rod 28 and the double prime numerals 1"–24" indicate the corresponding positions of end 27 when the prime number is the same as the double prime number. Approximate sine wave 32 is a plot of the movement of end 27 against time (the velocity of end 27). The plus sign of the graph indicates distance in the direction from C to D, also shown by the marks above the line CD, and the minus sign indicates distance traversed in the opposite direction, also shown by the marks below line CD. It can be seen that 13 units of time (units 1" to 13") are employed in the forward direction and eleven (units 14" to 24") in the reverse direction. Circular path 30 is broken up into 24 equal periods of time as movement of rod 28 along it is at a constant velocity.

End 27 moves more rapidly in the reverse direction (note E in FIGURE 7) as it moves approximately 7 distance units per time unit at its maximum negative speed and 5 distance units per time unit in the forward direction (note F in FIGURE 7). The changes in velocity are gradual as are the changes in the direction of velocity as can be seen by the wide spread of the prime numbers in the center of line CD which tapers off toward the ends of the line. By varying the length of rod 28 and/or the position of the path it is to travel, desired movements can be produced. It can be seen in FIGURE 7 that if driver pulley 13 is constantly driven at 5 distance units per time unit, the belt will travel in the reverse direction only during the portion of time the reciprocating pulley moves at velocities below line G—G. Naturally, the linear speed can be increased so that there is never any negative velocity.

FIGURE 8 is a plan view of a mail sorting machine in accordance with our invention and FIGURE 9 is a side elevational view of the machine of FIGURE 8. In U.S. Patent No. 3,140,767, July 14, 1964 for High Speed Automatic Mail Sorting Systems, by Werner Hauer, there is described a system in which trays containing holding devices for holding articles of mail are passed over bins to which the mail is to be delivered. Machine 33 is intended for a small office; space is therefore critical. Small office machine 33 utilizes our driving means for driving trays 34 in combination with means 33a for moving bins 35 to effect sorting of mail articles to at least one hundred, and as many as one hundred and five bins while the trays themselves only traverse a distance equivalent to 45 bin widths. Only above bin positions 201–245 in FIGURE 8 do chutes 36a and ejecting devices 36 need to be provided for ejecting mail from the trays into all one hundred bins 101–200. It is desirable to pass trays 34 over bins 35 while bins 35 are stationary as if trays 34 are passed over bins 35 while they are moving, more complex circuit designs will be required to insure that the mail ejected from the trays will be ejected into the proper bins. Ejection of the mail therefore is not accomplished during the backward movement of the conveyor and trays. In order to serve the 100 bins (101–200) while traversing the 45 bin positions (201–245) our apparatus is used to apply an intermittent and continuously varying velocity to conveyor 37 which moves trays 34. The provision of this movement avoids the need for abrupt changes in the direction of movement of the heavy trays. Machine 33 is equipped with 100 bins, however, we will explain how 105 bins may be served if they are available.

In FIGURE 10 it can be seen that conveyor 37 moves forward 10 bin lengths and then backward 6 bin lengths achieving a total advance of 4 bin lengths per cycle. This is accomplished by having a driver pulley which will move the trays forward 4 bin lengths per cycle while imparting a reciprocating movement of 10 bin lengths forward and 6 bin lengths backward to conveyor 37 per cycle. Thus the portion 34′ of tray 34 over bin 101 in bin position 201 is moved to the right until it is over bin 111 (not shown) in bin position 211 and then moved back to the left until it is over bin 105 in bin position 205. During the movement of the trays in the reverse direction, i.e., backward, to the left, the bins on conveyor 37 are moved in reverse, to the left, 5 bin lengths so that the portion of the tray 34′ which is over bin position 205 is now over bin 110. Bins 102–110 are served during the first cycle. Bins 101 and 111 were not served as, in order for a bin to be served, the trays must be moved past them. During each of the next nine cycles, 9 bins will again be served. After 10 cycles, 90 bins will have been served and the portion of the tray 34′ that started over bin position 201 will have reached bin position 236. On the 11th cycle, 9 trays are again served and the portion 34′ will reach the 245th bin position and then be mover back to the 241st bin position. On the 12th cycle, 4 bins could be served by this tray (those under bin positions 242, 243, 244, and 245) and then the tray will be moved back to the 244th position. On the 13th cycle one bin (the next bin under the 245th bin position which will be bin 105) could be served. Thus 105 bins can be served while the trays traverse 45 bin lengths. During the 12th and 13th cycle, bins 101–105 are again below the portion 34′ and therefore no processing is done during these cycles in a 100 bin machine by portion 34′.

The system disclosed herein has wide application, and may be used with known and complementary systems which sense letter designations and eject the letters into the correct bins. Such a complementary system is disclosed as U.S. Patent No. 3,140,767; issued July 14, 1963 to Werner Hauer for High Speed Mail Sorting Systems. It should be considered that the distributing system movements and operation may be employed with the cited High Speed Automatic Mail Sorting Systems. Therefore, it will be assumed that the complementary sensing apparatus is ineffective unless the trays 34 are passed over the bins 35. That is, to simply position trays 34 above a bin 35 (according to the limitations of the cited patent) is inadequate for destination sensing. (Of course, complementary systems other than the one considered in the present discussion may sense and dispatch letters to bins over which they locate.)

To explain the operation of this system, synoptically: the basic motion device in FIGURE 1 is the driving means for the trays of the apparatus in FIGURE 8. Therefore, consideration of FIGURE 1 and page 2, line 26 of the specification, when taken together, show that the apparatus has an endless belt 1 for conveying articles along the surface 2. The arrow shown in FIGURE 1 indicates the direction of travel to be to the right. Again in FIGURE 10, the forward and back motions of the trays (of the apparatus shown in FIGURE 8) are charted and represented in cycle segments. It is to be noted that the first cycle represents forward and back movements. As charted and represented, the back portion of the first cycle is indicated with an arrow to the left. These motions are shown by directional arrows on FIGURES 8 and 9. Thus, the motion drawn from the belt of FIGURE 1 represented again on FIGURE 10, and the cycle segments there presented, depict the motion of trays 34 and bins 35. More, with respect to directions of movement and the synchronization of bin movement with trays movement, it can be seen that the trays 34 are passed over the chutes 36a and bins 35 in the forward direction for a traverse of 10 bin lengths. While this traverse is being executed the bins are held stationary beneath the fixed chutes. Next the trays are moved back 6 bin lengths, that is, they are caused to traverse a reverse distance equal to six bins while, simultaneously, the bins are moved backward, beneath the chutes, five bin lengths. The synchronization then is simply that: the trays move forward 10 bin lengths, while the bins remain stationary, and the trays then are retracted six bin lengths while the bins also retreat five bin lengths in the same direction. The trays, then, have a forward and reverse movement, and the bins have a unidirectional and intermittent movement in reverse. The speed of these movements is immaterial to the present disclosure. A tolerable speed would be that dictated by sensors which must read the address of the mail and release it to the proper bin. As noted previously, sensors and mail ejecting means are part of the Automatic Mail Sorting System, U.S. Patent No. 3,140,767, referred to above.

The purpose of the reciprocating movement for the trays is provision of means and method for sorting articles which will utilize a minimum of space. It has been pointed out that this apparatus and system effects a sorting of mail articles to at least 100 and as many as 105 bins while the trays themselves only traverse a distance equivalent to 45 bin widths. This distributing system, then, employs reciprocating movement for the trays to accomplish mail distribution to 105 bins in a space requiring a little more than 45 bin widths. Thus, machines using this apparatus and this system can be installed in small offices.

At each of the bin positions 200–245 sensors detect the destination of the bin underneath and ejection devices are provided which ejects mail having the same destination as the bin below it. These devices and sensors do not form a part of this invention and are explained in the U.S. Patent No. 3,140,767 above referred to. A continuous reassignment of the destination sensors in the receiver positions which indicate the destination of the bin below the trays must be continuously accomplished in order to collate the proper bin desination with the proper bin. Since the pattern of reassignment is a shift of a certain amount of bins each cycle, the circuitry required is mainly a shift in the parallel wiring in conjunction with a phase monitor. Thus the destination assignment becomes a simple marking process without active circuitry.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. A distributing system for transferring articles from trays to a specific number of bins at a specific number of transferring positions wherein the number of bins exceeds the number of transferring positions comprising: a plurality of trays, a plurality of bins, means for moving the bins in one direction through the system below the trays, and means for causing the trays to move at a constantly varying velocity in a reciprocating manner above the bins.

2. A distributing system according to claim 1 wherein said bins only move during the period when said trays are moving in the same direction as said bins move.

3. A distributing system for transferring articles from trays to bins comprising:
 a plurality of trays;
 a plurality of bins;
 a first conveyor means for said trays, disposed along a horizontal plane for a given distance;
 means for repetitively moving said first conveyor means in one direction and then in a reciprocal direction at a constantly varying velocity above the bins; and
 second conveyor means for moving said bins in one direction below said first conveyor means to receive said articles from said trays at bin positions.

4. A distributing system, according to claim 3, wherein: said moving means move said first conveyor means a greater distance in said one direction than in the said reciprocal direction.

5. A distributing system, according to claim 4, wherein the number of said bins is greater than twice the number of said bin positions.

6. A distributing system, according to claim 3, wherein said moving means move said first conveyor means at a constantly varying velocity.

References Cited by the Examiner

UNITED STATES PATENTS

| | | | |
|---|---|---|---|
| 882,635 | 3/08 | Hodgkinson | 74—219 |
| 1,801,043 | 4/31 | Harber et al. | 74—219 |
| 2,212,348 | 8/40 | Ludington | 74—242.8 |
| 2,352,797 | 7/44 | Miller. | |
| 2,683,993 | 7/54 | Covert | 74—219 |
| 2,901,089 | 8/59 | Rabinow | 198—38 |
| 3,059,753 | 10/62 | Lisinski | 198—38 |

SAMUEL F. COLEMAN, *Primary Examiner.*

EDWARD A. SROKA, *Examiner.*